Figure 1:
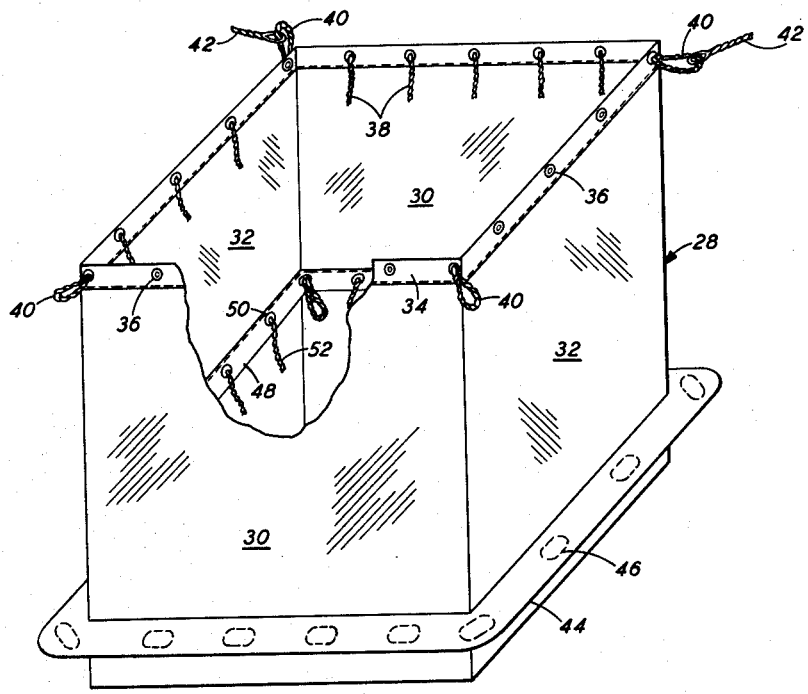

Dec. 18, 1962     D. W. SCHOOLCRAFT     3,068,982
HATCHWAY CHUTE SYSTEM FOR CARGO SHIPS
Filed March 18, 1960

INVENTOR
DOYNE W. SCHOOLCRAFT

BY *Naylor & Neal*
ATTORNEYS

3,068,982
HATCHWAY CHUTE SYSTEM FOR CARGO SHIPS
Doyne W. Schoolcraft, 1962 Greenwich St., San Francisco, Calif.
Filed Mar. 18, 1960, Ser. No. 16,084
5 Claims. (Cl. 193—30)

This invention relates to cargo handling, and more particularly to a hatchway chute system for use during the handling of ship cargoes.

It is common practice for freight carrying vessels to be used to transport multiple types of cargo at one time. For example, a given ship may carry in its lower hold a payload of a dirty, dusty or contaminating nature, such as ore, limestone, or the like, and it may carry in one or more of its tween deck spaces a preloaded shipment of, for instance, new automobiles. During the loading of the contaminating cargo, and also during the unloading thereof if such takes place before the automobiles are unloaded, the pre-loaded cargo is subjected to an atmosphere containing contaminating fines. In order to protect the automobiles and other types of pre-loaded cargo requiring protection it is customary to liberally employ masking tape and other covering materials over those portions of the cargo which are especially vulnerable to the effect of the bulk cargo particles. Such protective efforts are expensive from the standpoint of labor costs, and despite these efforts some damage to the pre-loaded cargo can generally be expected.

The essential object of the present invention is to provide a protective chute and means associated therewith for selectively sealing off all or part of a vessel's tween deck space from the vertical hatchway through which the multiple species of cargo are loaded and unloaded.

Figure 2:
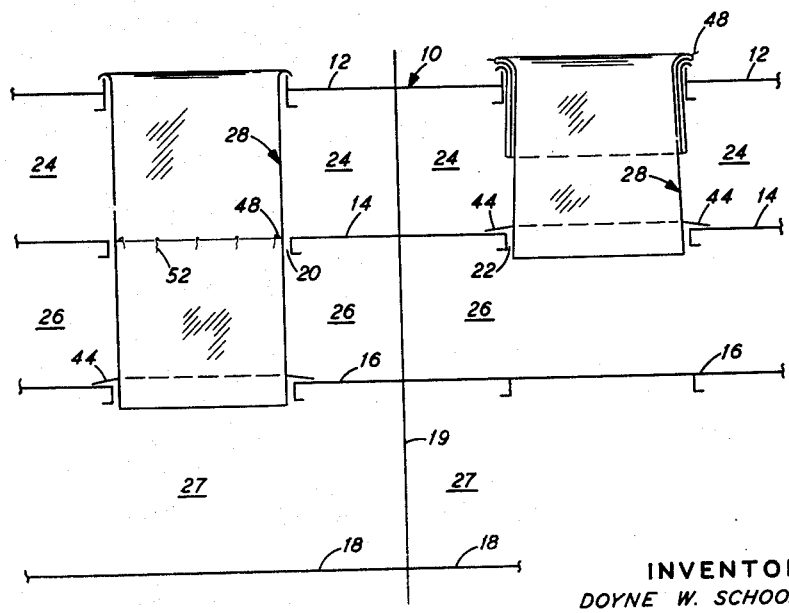

Other objects and advantages of the invention will be apparent from the following description taken in conjunction with the drawing forming part of this specification, and in which:

FIG. 1 is a view in perspective of the hatchway chute embodying the invention; and FIG. 2 is a semi-schematic view in transverse cross section illustrating the mode of use of the hatchway chute in relation to the structure of a cargo ship.

Referring to the drawing, a cargo carrying vessel indicated generally by the reference numeral 10 is shown as comprising a weather deck 12, intermediate or tween decks 14 and 16, lower deck 18, and bulkhead 19. Defined by these respective partitioning elements and by vertically aligned openings therethrough are hatchways 20 and 22, upper tween deck storage space 24, lower tween deck storage space 26, and lower hold space 27.

Bulk cargo is adapted to be loaded through hatchway 20 into lower hold space 27, while non-bulk cargo, such as automobiles, etc., is adapted to be loaded through hatchway 20 into storage spaces 24 and 26. Bulk cargo is adapted to be loaded through hatchway 22 into space 26, while non-bulk cargo is adapted to be loaded through hatchway 22 into storage space 24.

In order to protect the non-bulk cargo while the bulk cargo is being loaded and unloaded from the vessel, the hatchways 20 and 22 are selectively provided with an elongated tubular element or chute, indicated generally at 28, which is complemental to the cross-section of the hatchway and co-extensive with the effective length thereof. The chute is formed with opposed pairs of side walls 30 and 32. The upper end of the chute is provided with a peripheral hem 34, a plurality of grommets 36 therein to which tail ropes 38 may be connected, corner-disposed rope eyes 40, and tail ropes 42 extending from said rope eyes. By means of the tail ropes 38 and 42 the chute 28 is secured in place at the weather deck hatch coaming and extends downwardly into the hatchway.

A typical size for the chute is 41 feet by 25 feet in cross-section and 30 feet in length.

Adjacent its lower end the chute is provided with a peripheral skirt 44 which, compatible with the dimensions given above, is about 3 feet in width.

When bulk cargo is being loaded into the lower hold 27 through hatchway 20, the chute is extended full length down the hatchway and the skirt 44 is peripherally engaged with tween deck 16. When so disposed the chute seals off tween deck spaces 24 and 26 from the hatchway 20 and lower hold 27 and thereby ensures protection of tween deck cargo from the bulk cargo being loaded or unloaded.

Means are provided to secure the skirt 44 into sealing relation with deck 16, with said means comprising a plurality of spaced apart magnets 46 sewn into the skirt. Such means need not be integral with the skirt. For instance a few sandbags or other weights may be placed along each of the four sides of the skirt.

The chute is preferably made out of light weight, water-proof, dustproof nylon, although an eminently satisfactory full size prototype of the chute made and used was formed out of canvas. The pairs of chute sides 30 and 32 in this instance were made out of 29 inch widths of canvas hung vertically and interconnected with 1¼ inch seams.

Intermediate its length and interiorly thereof, the chute is provided with a full peripheral reinforced flap 48 which in turn is provided with a plurality of grommets 50 to which tail ropes 52 may be attached. By means of the tail ropes 52, which are of a length to reach the upper end of the chute, flap 48 is anchored to the weather deck hatch coaming to dispose the skirt 44 in sealing engagement with tween deck 14. When the chute is thus arranged bulk cargo loading through hatchway 22 into lower tween deck storage space 26 may take place. It will be appreciated that by means of the flap 48 and tail ropes 52 the chute may be repositioned from its fully extended condition within a hatchway to an internally telescoped condition where the skirt 44 is in engagement with deck 14.

What is claimed is:

1. A hatchway chute for a cargo carrying vessel adapted to seal off a hatchway from one or more tween deck storage spaces comprising a non-rigid elongated tubular element formed of a material which is substantially impervious to dust, said tubular element having a form in horizontal section substantially complemental to that of said hatchway, means connected to said tubular element adjacent the upper end thereof for securing said element to said vessel in depending relation within said hatchway, and means carried by said tubular element adjacent the lower end of said tubular element comprising a radially extendable, peripheral, non-rigid skirt engageable with a tween deck, said upper and lower means serving to positionally secure said tubular element within said hatchway so that there is no communication between the hatchway and the storage space located above the tween deck engaged by said skirt.

2. A hatchway chute according to claim 1 including a flap secured to said tubular element interiorly and peripherally thereof and located intermediate the ends thereof, and tail rope means connected to said flap and extendable to the upper end of said tubular element, whereby the lower end of said tubular element may be raised or lowered relative to the upper end thereof to dispose said skirt for engagement with a selected one of a pair of tween decks.

3. A hatchway chute according to claim 2 including means for releasably connecting said skirt to a tween deck.

4. A hatchway chute for a cargo carrying vessel adapted to seal off a hatchway from tween deck storage space comprising a non-rigid elongated tubular element having upper and lower ends adapted to occupy said hatchway and define therein a laterally enclosed passageway for the transmission therethrough of bulk cargo, means connected to said tubular element adjacent the upper end thereof for securing said element to said vessel in depending relation within said hatchway, and non-rigid means attached to said tubular element and adapted to peripherally interconnect the exterior of said tubular element with a tween deck of said vessel to prevent the passage of dust from said bulk cargo up said hatchway exteriorly of said tubular element into the tween deck storage space disposed above said tween deck.

5. A hatchway chute according to claim 4 including means secured to said tubular element intermediate the ends and interiorly thereof, said means being extendable to the upper end of said tubular element, whereby the lower end of said element may be raised or lowered relative to the upper end thereof to enable said second means to interconnect said tubular element with a selected one of a plurality of tween decks.

References Cited in the file of this patent

UNITED STATES PATENTS

| | | |
|---|---|---|
| 208,470 | Fuchs | Oct. 1, 1878 |
| 1,099,833 | White | June 9, 1914 |
| 1,520,440 | Pyleck | Dec. 23, 1924 |